United States Patent [19]
Kelly

[11] Patent Number: 5,771,877
[45] Date of Patent: Jun. 30, 1998

[54] FIELD BARBECUE APPARATUS

[76] Inventor: Thomas E. Kelly, 219 Plymouth Ave., Oreland, Pa. 19075

[21] Appl. No.: 708,523

[22] Filed: Sep. 5, 1996

[51] Int. Cl.⁶ ........................................ F24B 3/00
[52] U.S. Cl. ............................ 126/29; 126/30; 126/25 A; 126/41 R
[58] Field of Search .............................. 126/29, 30, 41 R, 126/268, 276, 25 A, 9 R

[56] References Cited

U.S. PATENT DOCUMENTS

| | | |
|---|---|---|
| 3,224,357 | 12/1965 | Rubens .................................. 126/30 X |
| 5,002,036 | 3/1991 | Kelly . |
| 5,031,602 | 7/1991 | Vick ...................................... 126/25 R |
| 5,070,857 | 12/1991 | Sarten ................................... 126/25 R |

*Primary Examiner*—Larry Jones
*Attorney, Agent, or Firm*—Eugene Chovanes

[57] ABSTRACT

A plurality of separable racks for stacking vertically within a sheet metal enclosure of a field barbecue apparatus. The racks permit optimum utilization of a body of still hot air within the enclosure and above the fire box of the apparatus.

2 Claims, 5 Drawing Sheets

FIELD BARBECUE APPARATUS

FIELD OF THE INVENTION

An apparatus of the type used for preparing foods, particularly meats, by barbecuing wherein the food is suspended over a burning layer of charcoal.

BACKGROUND OF THE INVENTION

In my U.S. Pat. No. 5,002,036 incorporated herewith by reference, I disclose an apparatus that prepares large quantities of food such as 24 or more 3-lb. whole dressed chickens, or a 70-lb. dressed hog, in a high initial temperature heat environment of, for instance, 450 degrees F., by creating a controlled air environment in which the food is suspended around a burning layer of charcoal briquettes. The controlled air environment is created by enveloping the charcoal and food in a metal, rectangular, boxlike structure of a firebox enclosure having a suitable series of ventilating holes at the bottom and top thereof. The boxlike structure is more specifically of a rectangular shape in cross section wherein the vertical dimension of the structure is approximately that of the width. It has been found that such a height in a rectangular structure will optimally contain a body of hot gases which quickly cooks the food, imparts taste, retains moisture in the food, cooks the food uniformly, keeps the food in such optimum condition after cooking as to preserve such optimum results, conserves the briquette charcoal cooking fuel, eliminates grease fires from dripping fat in the briquette layer, and substantially reduces risk from personal injury from exposed hot briquettes receiving dripping grease which flames or sputters, creating risk to bystanders.

Suitable vent holes are placed in the top of the rectangular enclosure as well as in the bottom of the firebox to provide both primary air from below the tray and secondary air from the upper vent holes. Additionally, the upper vent holes provide a restricted venting of the hot gases of combustion to avoid a build up of undesirable products of combustion within the chamber. The upper holes can be plugged to control secondary air supply as well as vent flow.

As disclosed in the U.S. Pat. No. 5,002,036, the food to be prepared, such as a pig, or a number of chickens, are placed on a grill located right above the hot charcoals.

SUMMARY OF THE PRESENT INVENTION

Multiple racks, suitably three, one above the other, are placed within the rectangular box enclosure of the apparatus of the U.S. Pat. No. 5,002,036.

The multiple rack arrangement has the following advantages:

1. More foodstuffs can be cooked in a given amount of time with a given amount of charcoal.

2. A combination of different products may be cooked at the same time, for instance, a pig on one rack and chickens on the other racks.

3. The cooking times of the different products, as referred to in paragraph 2 above, may be adjusted or staggered to provide the desired end timing.

4. The hot air cooking and warming environment within the large box type hood of the U.S. Pat. No. 5,002,036 is being utilized to its fullest.

5. Each of the cooking racks can be taken from the apparatus and set off by itself, with the cooked foodstuffs thereon, so that the cooking racks can also serve as service racks.

6. The racks can, when being used as a serving rack, also be used as a support during the cutting-up of the food, with a pan or other container being placed under the rack to catch the drippings.

7. The racks can be selectively removed from the cooking apparatus so that a rack or racks can remain in the cooking apparatus, while other rack or racks can be removed, and the contents of the rack cut and served.

8. The racks are desirably configured so that the legs of an upper rack fit within the confines of a lip on the lower rack.

DETAILED DESCRIPTION OF THE INVENTION

Figure 1:
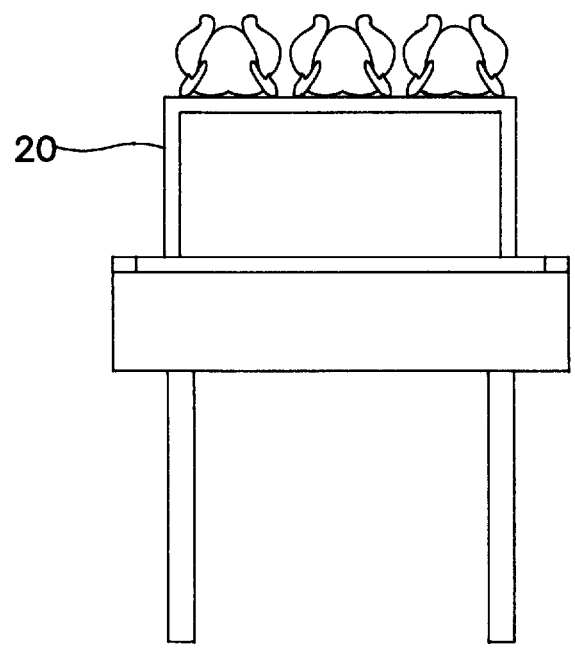
FIG. 1 shows an end view of the rack with rows of chickens on the rack.
Figure 2:
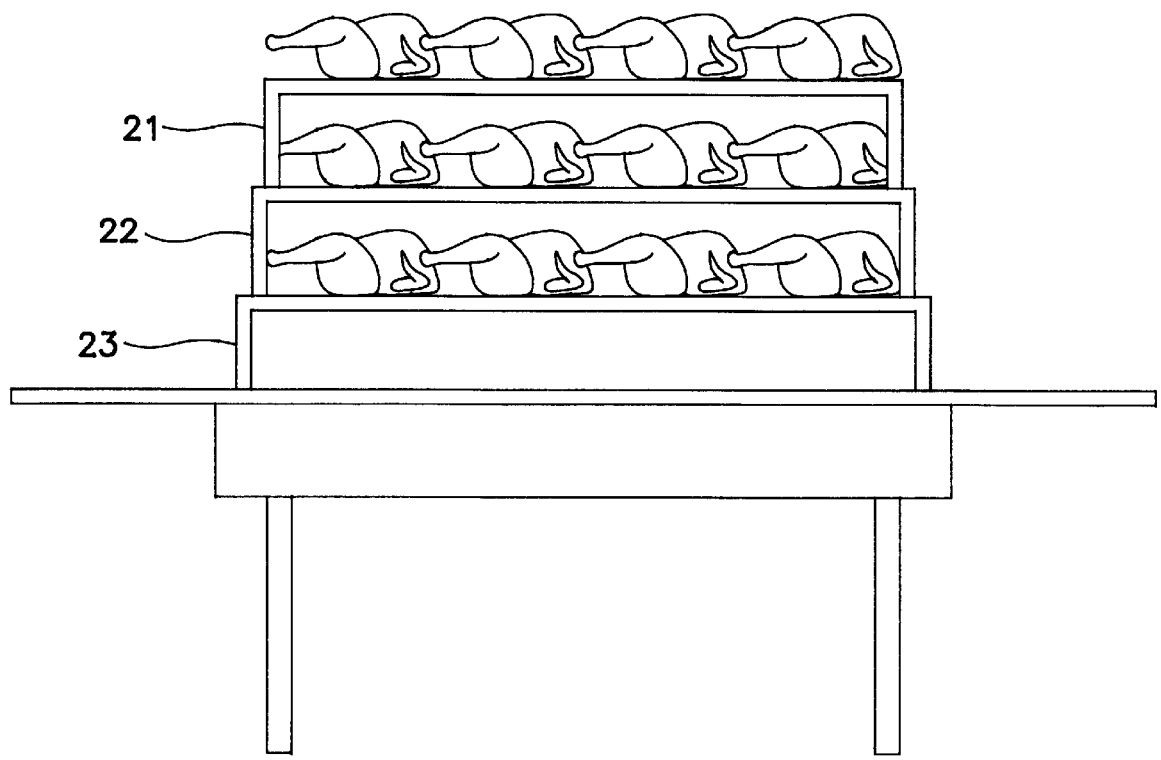
FIG. 2 shows a side view of a plurality of racks stacked atop one another and supported on a grill.

Reference is made to FIGS. 1, 2, 3, 4 and 5. FIGS. 1 and 2 are directed to chickens. In FIG. 1, there is shown a rack 20 which is similar to the grill shown in the '036 patent where there is one row of chickens on a rack, as is self-evident from the Figure. The rack shown in FIG. 1 has legs, for instance, 10 inches in length, at the corners of the metal grill, suitably of angle iron. The grill can be formed of an angle iron frame supporting a metal screen.

The present invention is concerned with the concept of multiple racks, as for instance, in FIG. 2, wherein there is shown a plurality of racks, 21, 22, 23, one above another. There is also shown a nesting arrangement wherein the legs on an upper rack rests on the frame of a lower one. Each frame angle can have an upward lip that prevents the legs of the upper rack from slipping sideways and then falling. The horizontal dimensions of each successive rack 21, 22, 23 going upward are slightly less.

The multiple racks 21, 22, 23 enable the user to cook more chickens at the same time, although the cooking time may be longer. For instance, if one row, as in FIG. 1 takes two hours, it may take 2½ hours to cook the chickens as shown in FIG. 2.

There are fourteen 3-lb. chickens, in dressed state (before dressing they would probably be 3½lbs.) in FIG. 1. In FIG. 2, there are again 14 on each rack, wherein the capacity of this cooker is thus doubled.

Where three racks are used in the invention, the cooking capacity is proportionately increased.

Figure 3:
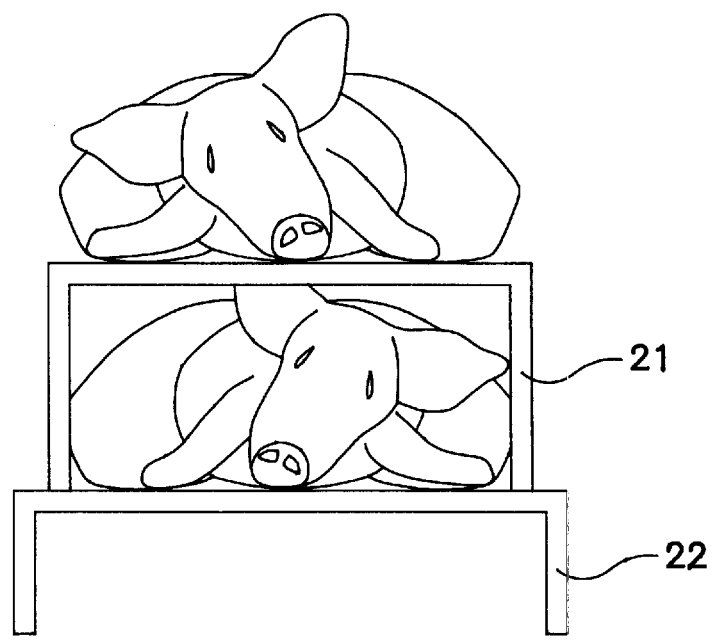
FIG. 3 shows an end view of a plurality of racks stacked one above the other and supporting a plurality of pigs.
Figure 4:
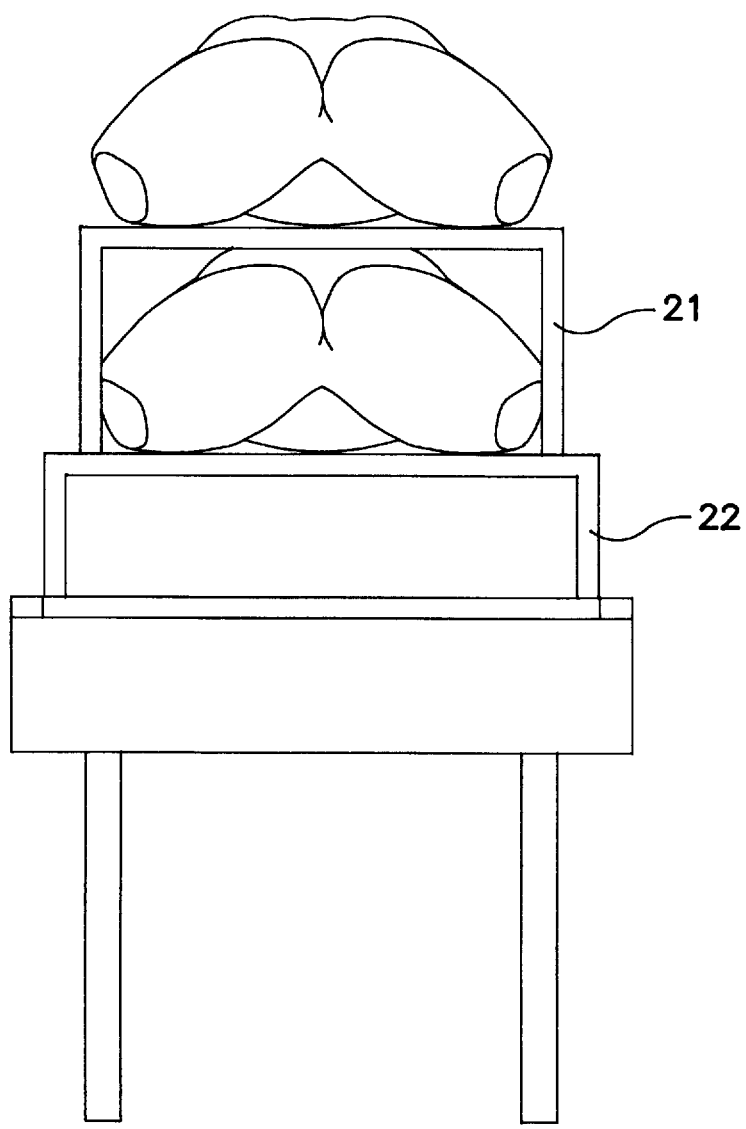
FIG. 4 shows an end view of a plurality of racks stacked one above the other and supported on a grill.

With respect to cooking pigs, there is shown a rack arrangement in FIGS. 3 and 4. The pig on the lower level is omitted but one pig is placed above the other as shown in FIGS. 3 and 4 on intermediate racks. The legs on these racks may be suitably longer such as 14 inches, to provide adequate space for the pigs. Again, this permits an increase in capacity, twice as much, although the cooking time may be slightly longer, (for instance, an 85-lb. pig might take 5 hours whereas with two 85-lb. pigs, it may take 6½ hours).

Again, as with chickens, the invention utilizes a vertically structured arrangement to obtain his cooking.

There may be a combination of cooking different products. For instance, one may start out with a pig at the lower level of the rack as shown in FIG. 4. Then, one may later add chickens as shown in the upper racks of FIG. 2. In that way, one can utilize the capacity of the cooker to a much greater degree and in fact do multiple cooking simultaneously in one cooker instead of two. In such instance, it would be necessary to time the cooking operation. For instance, one might keep the pig on for two or three hours before putting on the chickens and again, keeping an eye on control. One may remove the chickens prior to removing the pig if the chickens are cooked before the pig ends up being cooked. However, one should remember that the ultimate is that both are done at the same time in the timing but then if one is done before the other chicken or pig, one could suitably remove them.

Although rack arrangements are old in gas-fired ovens, as for instance in chicken broiling apparatus or in more permanent installations, the present invention utilizes the large boxlike hood that maintains a hot air cooking and warming environment around the food in a field barbecue apparatus. My earlier U.S. Pat. No. 5,002,036 cited above recognized the concept of creating such a large air atmosphere, and the present development utilizes this large air atmosphere in an extremely efficient way in a multiple rack arrangement.

Another feature of the present invention, as seen with the pig rack, for instance, is that it is much easier to take a rack, which is separate from the cooking box itself, with its legs, to a table away from the fire. This is an improvement over the earlier '036 patent where one had to take the pig off by itself and put it over on the table, since the supporting surface under the cooking system was not meant to be taken and set over on a table. Also, when one takes the other racks of different foods, then the racks themselves serve not only as structure in the cooking process but also serve as supporting surfaces during the serving process and one can cut the food on the racks and one can put a pan or anything underneath to catch any drippings.

Also, one can selectively remove the racks so that while one is cutting and serving the contents of one of the racks, the remaining rack can stay right in the cooking arrangement and keep warm during that period of time. It gives much more versatility to the entire process, and the object is to get hot food.

In a preferred arrangement, the legs will be slightly inset so that all the racks will have the same horizontal dimensions, and one can then alternate and put the top rack lower if one wants more heat on the contents of the top rack.

Figure 5:
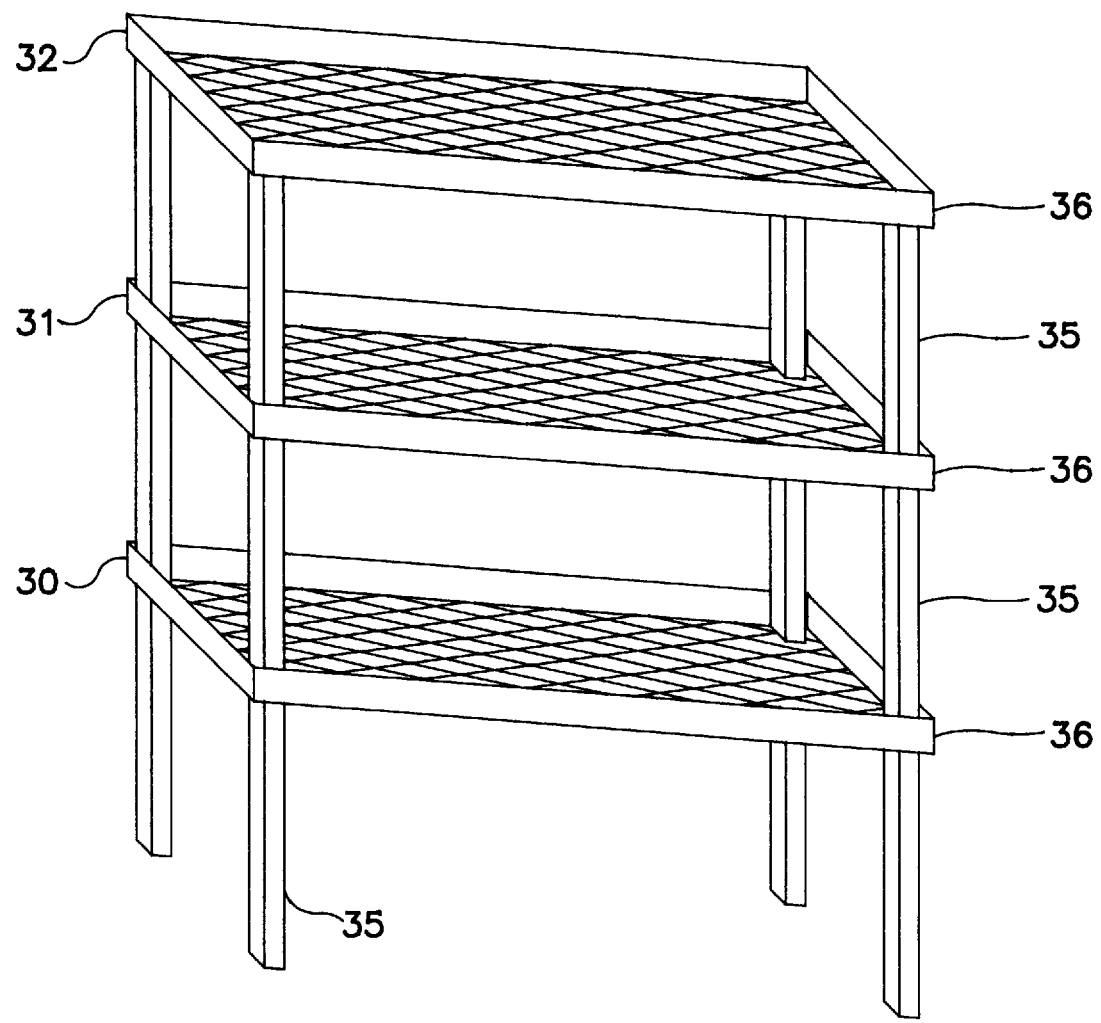
FIG. 5 shows a plurality of the racks stacked one above the other showing the wire support surface of the racks and the support leg position.

In other words, the racks will be totally interchangeable by virtue of this lip and yet the outside dimensions of each of the supporting surfaces will be the same. Such an arrangement is shown in FIG. 5, wherein the racks 30, 31, and 32 are identical. The legs are slightly inset from the corners of the frame 36.

I claim:

1. In combination with a field barbecue apparatus having a (1) firebox,
   (2) fire bed, and
   (3) a sheet metal enclosure
      (a) over the firebox,
      (b) rectangular in vertical and horizontal cross-section,
      (c) greater in height than in width,
      (d) with ventilating holes,
      (e) containing and positioning a body of still gases above food being cooked in the apparatus; the improvement comprising rack means having a plurality of vertical stackable racks, for supporting the food during the
         (1) preparation for barbecuing outside the apparatus
         (2) barbecue inside the apparatus, and
         (3) serving outside the apparatus; wherein the racks can be used selectively and individually for each of the above, each rack having a horizontal frame supporting a metal screen within the frame, and legs depending from the frame, wherein the racks are adapted to be stacked one atop the other within the sheet metal enclosure and over the fire bed.

2. The apparatus of claim 1 wherein the legs of a rack are inset relative to the frame, wherein the racks can be interchanged in the stack.

* * * * *